United States Patent [19]

Rabi et al.

[11] 4,113,597

[45] Sep. 12, 1978

[54] CATHODIC ELECTRODEPOSITION OF POLYAMINE RESINS USING CARBONIC ACID NEUTRALIZATION

[75] Inventors: Rafat T. Rabi, Villa Park, Ill.; Edward J. Murphy, Williamsport, Pa.; John A. Basoms, Chicago, Ill.

[73] Assignee: DeSoto, Inc., Des Plaines, Ill.

[21] Appl. No.: 745,240

[22] Filed: Nov. 26, 1976

[51] Int. Cl.² ............................ C25D 13/06; C25D 13/10
[52] U.S. Cl. .................................................. 204/181 C
[58] Field of Search .................................... 204/181 C

[56] References Cited

U.S. PATENT DOCUMENTS 3,939,051   2/1976   Anderson et al. ............... 204/181

*Primary Examiner*—Howard S. Williams
*Attorney, Agent, or Firm*—Dressler, Goldsmith, Clement, Gordon & Shore, Ltd.

[57] ABSTRACT

A simplified method for the cathodic electrodeposition of polyamine resin from a dispersion thereof in an aqueous electrocoating bath is provided in which the polyamine is selected to be stably dispersible in water in the form of a salt with a solubilizing acid at a pH of from 6.0–7.5, and this polyamine resin is substantially completely neutralized with carbonic acid and dispersed in water in the form of an amine carbonate or bicarbonate. A unidirectional electrical current is passed through an aqueous electrocoating bath containing the amine carbonate or bicarbonate to deposit the polyamine resin at the cathode and cause the release of carbon dioxide. In preferred practice, a proportion of the amine groups in the polyamine resin within the bath, low enough to maintain the pH of the bath at a pH of about 6.0 or higher, is reacted with a relatively nonvolatile solubilizing acid, and the polyamine resin solids in the electrocoating bath are replenished by adding to bath polyamine resin substantially completely neutralized with carbonic acid.

9 Claims, No Drawings

CATHODIC ELECTRODEPOSITION OF POLYAMINE RESINS USING CARBONIC ACID NEUTRALIZATION

The present invention relates to the cathodic electrodeposition of polyamine resins from dispersion thereof in an aqueous electrocoating bath.

The cathodic electrodeposition of polyamine resins from an aqueous bath containing the resin dispersed in water in the form of an amine salt with an acid which protonates the amine groups, is well known, and it is also known to employ organic acids, such as formic acid, which tend to decompose when released in free acid form during the electrodeposition process under normal electrocoating conditions (see U.S. Pat. Nos. 3,455,806; 3,582,511; and 3,682,814). However, these acids when used in an amount to neutralize 90% or more of the amine groups present so as to provide a stable aqueous dispersion of the amine resin, produce a bath which is excessively acidic and this introduces corrosion difficulties. Also, during the electrodeposition process, the unidirectional electrical current deposits the amine resin at the cathode and the solubilizing anion loses its electrons to the anode, so free acid is formed and accumulates. This free acid can be consumed by introducing partially neutralized resin, or it can be removed by ultrafiltration, or both, but this introduces control difficulties and, moreover, the free acid is corrosive and it decreases bath pH and increases conductivity leading to a more corrosive bath and lowered rupture voltage.

The burden of removing accumulated acid normally exceeds the ultrafiltration capacity needed for closed loop rinsing, and this leads to unnecessary installation and extra ultrafiltration which is costly and which can disturb the solvent balance.

In this invention, the pH is maintained above 6.0, no special condition is maintained around the anode, and nothing is done to either encourage or discourage the decomposition of excess acid, such as the superatmospheric pressure suggested in U.S. Pat. No. 3,682,814 when carbonic acid is contemplated.

The essence of the teaching of U.S. Pat. No. 3,682,814 is to employ a highly acidic system (pH 1.5-5.5, generally 2-3.5) with conditions being established and maintained near the anode which are specially conducive to the decomposition of the selected decomposable acid so that the acid will be stable in the bath, but unstable in the anode zone. The high acidity leads to corrosive conditions and the inability to use carbonic acid without the use of superatmospheric pressure in a portion of the bath detracts from the feasibility of the operation. Also, the process of this patent requires the feeding of additional acid at the rate it is being decomposed, and it is desired to provide a process using a substantially neutral aqueous solution concentrate to replenish the electrocoating bath. In this replenishment concentrate, the polyamine resin is in water solution in the form of an amine carbonate or bicarbonate, and no attention is paid to any correlation between acid addition and any rate of acid decomposition which may take place. Instead, resin replenishment is related to maintaining the proportion of resin in the bath, and acid decomposition is ignored because it is automatic.

In accordance with this invention, a polyamine resin is selected which is stably dispersible in water in the form of a salt with a solubilizing acid at a substantially neutral pH of 6.0-7.5, preferably 6.2-7.0, and this polyamine resin is substantially completely neutralized with carbonic acid and dissolved in water in the form of an amine carbonate or bicarbonate to provide an aqueous concentrate which is substantially neutral and which resists hydrolytic degradation despite being substantially completely neutralized. This concentrate can be diluted with water and used for electrocoating, or the electrocoating bath can be formulated using a relatively nonvolatile solubilizing acid to partially neutralize the polyamine resin, preferably without decreasing the bath pH below 6.0, and this bath containing two solubilizing components is replenished with the amine carbonate or bicarbonate aqueous concentrate of this invention. A unidirectional electrical current is passed through the bath to cause the polyamine resin to deposit at the cathode. The bath is preferably maintained at atmospheric pressure and agitated to maintain a generally uniform composition throughout the bath and the accumulation of carbonic acid is ignored. This accumulation can be ignored because, at atmospheric pressure and under normal bath conditions, any accumulation of carbonic acid simply decomposes, with the carbon dioxide by-product being released to bubble away innocuously.

While preferred practice of this invention avoids creating any different or unusual condition in the vicinity of the anode, the establishment or maintenance of such a condition around the anode does not interfere with the practice of this invention, though it is not helpful.

One difficulty in replenishing a cathodic electrocoating system is that the replenishment concentrate must be stored water-free, for an aqueous concentrate would degrade with storage because of the excessive acidity. In this invention, the aqueous concentrate is substantially neutral, so it can be stored for long periods without harmful degradation. Since it is an aqueous concentrate, it can be incorporated into the electrocoating bath as needed without the special mixing equipment needed for handling a nonaqueous concentrate.

The replenishment concentration in this invention places the polyamine resin substantially completely in the form of an amine carbonate or bicarbonate. Nonetheless, a small amount of a relatively nonvolatile solubilizing acid may be present in the aqueous concentrate so long as its presence does not reduce the pH of the aqueous concentrate below about pH 6.0.

The presence of a small amount of relatively nonvolatile solubilizing acid is helpful in the electrocoating bath since it adds stability to the bath, particularly when the bath is agitated without electrocoating being carried out for long periods of time. However, a small proportion of the bath itself is carried away with the electrocoated product, and it is helpful to replace this dragged out acid by including a small amount of relatively nonvolatile solubilizing acid in the aqueous replenishment. The small amount referred to is generally not in excess of 10% neutralization, more preferably not in excess of 5% neutralization of the polyamine resin, but up to about 30% neutralization is broadly contemplated.

The polyamine resins which are utilized in this invention are subject to wide variation, the present contribution being illustrated by solvent-soluble copolymers including a proportion of copolymerized tertiary amine monomer. Diverse other types of polyamine resins are available and the only criteria is that the polyamine resin be stably dispersible in water with the aid of a solubilizing acid at a pH which is not lower than about 6.0.

In the copolymers used to illustrate this invention, the tertiary amine monomer component is generally varied in proportion of from 5-30% of the copolymer, and is preferably used in an amount to provide an amine value in the range of 30-150, preferably 40-100.

The tertiary amine monomers which are useful herein are illustrated by dimethyl aminoethyl acrylate or methacrylate, dimethyl aminopropyl acrylate or methacrylate, and dimethyl aminoethyl or propyl acrylamide or methacrylamide. The dimethyl amino monomers are preferred, but the diethyl amino monomer counterparts are also useful. The diverse polyamine resins which may be utilized are further illustrated by the epoxy-urethane diprimary amine adducts of Sekmakas U.S. Pat. No. 3,963,663, dated June 15, 1976. It is also possible to provide polyamine resins which are soluble at appropriate pH by reacting an epoxy resin with a monosecondary amine as described more fully in Sekmakas U.S. Pat. Nos. 3,804,786 and 3,891,527.

It is particularly preferred to employ as a component of the copolymer a diepoxide which has been reacted with a plurality of ethylenically unsaturated moieties which may be either monocarboxlic acids or monohydric alcohols. Appropriate unsaturated monocarboxylic acids are illustrated by linseed oil fatty acids and the unsaturated alcohols are illustrated by oleyl alcohol and allyl alcohol, the latter being particularly illustrated in the examples herein.

The presence of a diepoxide reacted with a pair of monofunctional components (either monoalcohol or monoacid) to provide a diether or diester derivative capable of copolymerizing at a plurality of locations (in excess of about 1.4 per molecule, preferably about 2.0 per molecule) is particularly advantageous. The presence of such epoxy derivatives in an amount providing from 10-50%, preferably from 15-40% of the weight of the copolymer is especially desirable. As will be evident, these copolymers contain a tertiary amine monomer as previously described.

The epoxy ether copolymers which are particularly useful herein are the subject of U.S. Pat. No. 3,976,615 dated Aug. 24, 1976.

A water-soluble or water dispersible resinous crosslinking agent is also normally present, such as an aminoplast resin and/or a phenoplast resin, as is well known in the art. The use of these materials is not crucial to this invention since any curing mechanism may be used.

From the standpoint of concentration, the electrocoating baths used herein have a resin solids content of from 4-25%, preferably 5-15%. The aqueous concentrates used to replenish the baths have a resin solids content of 30-65%, preferably from 40-60%.

Appropriate relatively nonvolatile solubilizing acids which may be used in this invention are illustrated by acetic acid, lactic acid, phosphoric acid and glycollic acid. The selection of any particular acid is not a feature of this invention, though the use of a nonvolatile solubilizing acid in the combination of this invention has considerable significance.

Solubilization in water is also aided by the presence of a water miscible organic solvent in an amount of from 10-100%, preferably 40-80%, based on the weight of the polyamine resin. Suitable solvents are well known and are illustrated in the Examples.

Electrocoating in this invention can be carried out on any electrically conductive substrate, but iron substrates are particularly desirable since iron is normally difficult to use as an anode. This is because the anode dissolves placing iron ions in the deposited coating, and this is avoided when the deposit is at the cathode. The electrocoating baths may be pigmented or not as desired, aminoplast curing agents are frequently incorporated to assist the desired cure, and auxiliary agents can be added for various purposes.

One feature of this invention is the fact that the largely neutral pH of the electrocoating bath and of the aqueous replenishment concentrate minimizes degradation of the polyamine resin which is used. Coupling this with the automatic pH control provided herein means that the usual ultrafiltration operation can be eliminated which is quite advantageous.

It will be understood that throughout this specification and claims, all proportions are by weight unless otherwise stated.

The invention is illustrated in the comparative examples which follow. In this comparison, we first used carbon dioxide in the form of dry ice to form the amine carbonate or bicarbonate with all of the amine groups in a typical polyamine resin which is soluble in water at a pH above 6.0. We then used the same polyamine resin, but this time we used lactic acid as the solubilizing acid. We neutralized only 90% of the amine groups in the polyamine resin for the reason that 100% neutralization with lactic acid created an unduly low pH which is undesirable.

EXAMPLE 1

| Charge: (grams) | | A | B |
|---|---|---|---|
| 1) | Epoxy modified cationic vehicle (see Example 2) | 110.75 | 110.76 |
| 2) | Water dispersible hexamethoxy methyl melamine (note 1) | 21.18 | 21.18 |
| 3) | Lactic acid | 7.80 | — |
|  | $CO_2$ as dry ice (note 2) | — | 15.60 |
| 4) | Deionized water (to provide 9% nonvolatile solids) | 860.26 | 852.46 |
|  |  | 1000.0 | 1000.0 |

Procedure (1) Charge the cationic vehicle and melamine resin to a stainless steel beaker and mix well.
(2) Add acid in small increments and mix well.
(3) Add deionized water in small increments and mix well.
(4) After the mixture inverts to form an aqueous system, add the rest of the water.

| Bath Properties | A | B |
|---|---|---|
| pH | 4.5 | 6.9 |
| Conductivity (micromho/cm.) | 1380 | 670 |
| Dispersion | good | good |
| Percent Nonvolatiles | 9 | 9 |
| Stability at 130° F. | precipitates 11 days | no precipitate 16 days |

Note 1 - partially ethoxylated hexamethoxy methyl melamine CLA 1116 supplied by American Cyanamid Company may be used.
Note 2 - The amount of carbonic acid added is 300% of requirements for theoretical neutralization to insure substantially complete neutralization. The excess $CO_2$ either evaporates or is innocuous.

EXAMPLE 2

Epoxy Modified Cationic Vehicle (Monomer Composition)

| | |
|---|---|
| Diallyl ether of diglycidyl ether of bisphenol A of average molecular weight of 1000 (note 3) | 30 (64.5% solids) |
| Dimethyl amino propyl methacrylamide | 18 |
| 2-Ethylhexyl methacrylate | 42 |
| Hydroxy ethyl acrylate | 10 |
| | 100% |

| Solvent Composition | |
|---|---|
| 2-butoxy ethanol | 46 |
| 2-ethoxy ethanol | 34 |
| Methyl ethyl ketone | 20 |
| | 100% |

Note 3 - The diallyl ether is formed by the direct etherification of the diepoxide using excess allyl alcohol and $BF_3$ etherate as catalyst. The commercial diepoxide Epon 1001 from Shell Chemical Company may be used. The diallyl ether here used is supplied in solution in 2-butoxy ethanol at 64.5% nonvolatile solids at a viscosity of 3,960 centipoises.

Following a conventional solution copolymerization at 65% solids, the final epoxy copolymer contains 65% nonvolatile solids and an amine value (based on nonvolatiles) of 60.

EVALUATION

Example 1, Forms A and B, were reproduced, but the mixture of cationic vehicle and melamine resin were pigmented with titanium dioxide rutile, to a pigment to binder weight ratio of 0.3:1. The pigmented baths had the following properties.

| Pigmented Bath Properties | A | B |
|---|---|---|
| pH | 4.7 | 6.7 |
| Conductivity | 1050 | 700 |
| Dispersion | good | good |

On electrodeposition at the cathode, essentially the same results are obtained, but the more acidic pH and higher conductivity of the 90% neutralized lactic acid solubilized system in comparison with the 100% neutralized amine carbonate or bicarbonate systems is evident, and these factors make the lactic acid system much less desirable. The tendency toward corrosion is self-evident, but less evident disadvantages are also present. Thus, the rupture voltage of the lactic acid solubilized system is 165 volts while the amine carbonate or bicarbonate system ruptured at a higher deposition voltage (225 volts). The higher the deposition voltage, the greater the throwing power, and the thicker the film which can be deposited. Another disadvantage is the fact that the more acidic systems induce hydrolytic instability as a result of which the lower pH lactic acid system is less stable than the one of more neutral pH.

EXAMPLE 3

Copolymerization of Epoxy Ether Intermediate with Acrylates

| Charge | |
|---|---|
| Diallyl epoxy ether (see note 3 of Example 2) | 1550.40 |
| Dimethyl amino propyl methacrylamide | 375.00 |
| Ethyl acrylate | 500.00 |
| 2-Ethyl hexyl methacrylate | 625.00 |
| Azobisisobutryonitrile | 52.00 |
| N-butyl alcohol | 300.00 |
| 2-butoxy ethanol | 257.00 |

Procedure (Prepare the Following Mixtures A and B)

| Mixture A | | |
|---|---|---|
| Diallyl epoxy ether | 1162.80 | |
| Dimethyl amino propyl methacrylamide | 375.00 | |
| 2-butoxy ethanol | 257.00 | |
| Tertiary dodecyl mercaptan | 31.26 | |
| Mixture B | | |
| Diallyl epoxy ether | 387.60 | |
| Ethyl acrylate | 500.00 | |
| 2-ethylhexyl methacrylate | 625.00 | |
| Tertiary dodecyl mercaptan | 31.26 | |
| N-butyl alcohol | 300.00 | |
| Methyl ethyl ketone | 200.00 | The remainder of catalyst and solvent were pre-mixed and post-added to the reaction in equal quantities. |
| Azobisisobutyronitrile | 36.40 | |

(1) Charge mixture A to the reactor and heat under $N_2$ blanket to 90° C.
(2) Over a 2 hour period, add Monomer Mixture B.
(3) After addition of Monomer Mixture B is complete, continue heating at 90° C. for ½ hour, then post-add one-half of the remaining catalyst.
(4) Continue run for an additional hour, then add the rest of the catalyst.
(5) Continue reaction at 90° C. for 2 hours and cool to provide a product having the following physical properties:
Viscosity: 8,200 centipoises
Percent nonvolatiles: 64
Amine value on Nonvolatiles: 49.5

EXAMPLE 4

Preparation of Cationic Electrocoat Bath

| Composition | |
|---|---|
| Cationic vehicle of Example 3 | 600.00 |
| Water dispersible hexamethoxy methyl melamine (see note 1 of Example 1) | 96.00 |
| $CO_2$ (as dry ice) | 35.00 |
| Acetic acid | 2.00 |
| Deionized water | 5267.00 |
| | 6000.00 |

Procedure of Preparation

The cationic vehicle, melamine resin and acetic acid were admixed. The dry ice was added slowly in conjunction with small amounts of water and mixed well to produce a homogeneous dispersion, to which the remainder of water was added to produce a stable, homogeneous electrocoating bath having the following characteristics:

pH: 6.2
Conductivity 555 (micromho/cm)
Percent nonvolatiles: 9.0
Equivalence ratio of $CO_2$/acetic acid: 90/10

Preparation of Concentrated Replenishment Feed

| Composition | |
|---|---|
| Cationic vehicle of Example 3 | 775.39 |
| Water dispersible hexamethoxy methyl melamine (note 1 of Ex. 1) | 126.00 |
| $CO_2$ (as dry ice) | 60.00 |
| Acetic acid | 2.45 |
| Deionized water | 902.16 |
| | 1866.00 |

The concentrated replenishment feed was prepared as described for the bath material to provide a product having the following replenishment constants:

Percent nonvolatile: 50%
Equivalence ratio of $CO_2$/acetic acid: 98/2

The concentrate feed was a homogenous dispersion of easily pourable viscosity.

Turnover of the electrocoating bath was accomplished on a continuous strip coating apparatus.

| Turnover Conditions | |
|---|---|
| Line speed | 2 linear feet per minute |
| Squate feet coated/minute | 0.66 ft$^2$ |
| Temperature | 75° |
| Average voltage | 100 volts |
| Average amperes/ft$^2$ | 1.5 |
| Substrate coated | Zinc phosphated cold rolled steel |
| Total replenishment added | 1300.00 parts |
| pH variance | 6.2 – 6.4 |
| Conductivity variance | 400 – 500 (micromho/cm) |
| Number of turnovers | 1.6 |

The replenishment feed was added at 0.2 turnover intervals. The feed was added directly to the weir compartment of the electrocoating tank with no premixing or other special handling techniques.

No provisions were made, or were necessary, for treatment of the bath by ultrafiltration, electrodialysis, ion exchange, or any other technique to control pH.

EXAMPLE 5

Preparation of Electrocoat Bath (Composition)

| Cationic vehicle of Example 3 | 554.00 |
|---|---|
| Water dispersible hexamethoxy methyl melamine (see note 1 of Example 1) | 90.00 |
| Lactic acid (80% activity) | 17.85 |
| Deionized water | 4338.15 |
| | 5000.00 |

| Bath Constants: | |
|---|---|
| pH | 6.4 |
| Conductivity | 600 (micromho/cm) |
| Percent nonvolatiles | 9 |
| Percent neutralization of amino groups | 50 |

Preparation of Concentrated Replenishment Feed

| Cationic vehicle of Example 3 | 1231.00 |
|---|---|

| -continued | |
|---|---|
| Water dispersible hexamethoxy methyl melamine (see note 1 of Example 1) | 200.00 |
| $CO_2$ (as dry ice) | 40.00 |
| Lactic acid (80% activity) | 3.90 |
| Deionized water | 525.10 |
| | 2000.00 |

| Constants | |
|---|---|
| Percent nonvolatiles | 50 |
| Equivalence ratio of $CO_2$/lactic acid: | 95/5 |

| Turnover Conditions | |
|---|---|
| Line speed | 2 liner feet per minute |
| Square feet coated per minute | 0.66 ft$^2$ |
| Temperature | 80° |
| Average voltage | 100 volts |
| Average amperes/ft$^2$ | 1.5 |
| Substrate coated | Zinc phosphated cold rolled steel |
| Total replenishment added | 1800 parts |
| pH variance | 6.2 – 6.6 |
| Conductivity variance | 500 – 670 |
| Number of turnovers | 1.5 |

The replenishment conditions were the same as in Example 4.

We claim:

1. A method for the cathodic electrodeposition of polyamine resin from a dispersion thereof in an aqueous electrocoating bath comprising, selecting a polyamine resin which is stably dispersible in water in the form of a salt with a solubilizing acid at a pH of from 6.0–7.5, a proportion of the amine groups in said polyamine resin within said bath being reacted with a relatively nonvolatile solubilizing acid, substantially completely neutralizing said polyamine resin with carbonic acid, dispersing said neutralized resin in water in the form of an amine carbonate or bicarbonate, and passing a unidirectional electrical current through an aqueous electrocoating bath containing said amine carbonate or bicarbonate at pH 6.0–7.5 to deposit said polyamine resin at the cathode and cause the release of carbon dioxide.

2. A method of cationic electrodeposition as recited in claim 1 in which the polyamine resin solids in said electrocoating bath are replenished by adding to said bath polyamine resin substantially completely neutralized with carbonic acid.

3. A method of cationic electrodeposition as recited in claim 2 in which the resin of said bath is replenished by supplying to said bath an aqueous concentrate containing polyamine resin substantially completely neutralized with carbonic acid, relatively nonvolatile solubilizing acid being present to neutralize up to about 30% of the amine functionality in said polyamine resin.

4. A method of cationic electrodeposition as recited in claim 1 in which the relatively nonvolatile solubilizing acid is lactic acid.

5. A method of cationic electrodeposition as recited in claim 1 in which the relatively nonvolatile solubilizing acid is acetic acid.

6. A method for the cathodic electrodeposition of polyamine resin from a dispersion thereof in an aqueous electrocoating bath comprising, selecting a polyamine resin which is stably dispersible in water in the form of a salt with a solubilizing acid at a pH of from 6.0–7.5, substantially completely neutralizing said polyamine resin with carbonic acid, dispersing said neutralized resin in water in the form of an amine carbonate or bicarbonate, and passing a unidirectional electrical current through an aqueous electrocoating bath maintained under atmospheric pressure and containing said amine carbonate or bicarbonate at pH 6.0–7.5 to deposit said polyamine resin at the cathode and cause the release of carbon dioxide.

7. A method of cationic electrodeposition as recited in claim 6 in which said bath is agitated to maintain a generally uniform composition throughout the bath.

8. A method for the cathodic electrodeposition of polyamine resin from a dispersion thereof in an aqueous electrocoating bath comprising, selecting a polyamine resin which is stably dispersible in water in the form of a salt with a solubilizing acid at a pH of from 6.0–7.5, dispersing said polyamine resin in water with the aid of partial neutralization with a relatively nonvolatile solubilizing acid to form an electrocoating bath having a pH of from 6.0–7.5, passing a unidirectional electrical current through said aqueous electrocoating bath to deposit said polyamine resin at the cathode and thereby deplete the polyamine resin content of said bath, and replenishing the polyamine resin by supplying said bath with an aqueous concentrate having a pH in the range of 6.0–7.5 and containing said polyamine resin substantially completely neutralized with carbonic acid so as to be dispersed in the water of said concentrate in the form of an amine carbonate or bicarbonate.

9. A method of cationic electrodeposition as recited in claim 8 in which a small proportion of the amine functionality of the polyamine resin in said concentrate, up to about 10%, is neutralized with a relatively nonvolatile solubilizing acid.

* * * * *